Patented Dec. 22, 1942

2,305,593

UNITED STATES PATENT OFFICE 2,305,593

PLANT TREATMENT COMPOSITION

George S. Avery, Jr., New London, Conn., assignor to The Dow Chemical Company, Midland, Mich., a corporation of Michigan No Drawing. Application December 26, 1940, Serial No. 371,827

15 Claims. (Cl. 71—2)

This invention relates to plant treatment compositions and is particularly concerned with mixtures having both plant growth control and insecticidal properties and adapted to be applied to the aerial portion of plants. The present application is a continuation-in-part of co-pending applications Serial No. 104,542, filed October 7, 1936, and Serial No. 120,449, filed January 13, 1937.

Compounds such as indyl-acetic acid, alpha-naphthyl-acetic acid, and alpha-naphthyl-acetamid have been recognized as having an effect upon certain phases of plant growth and development and are widely employed as active constituents of orchard sprays designed to control abscission layer formation and subsequent fruit drop. Other uses for which these compounds have been applied are in connection with the stimulation of fruit development and the artificial fertilization of flowers to produce seedless fruits. These compounds have been indefinitely classified as "plant auxins" or "plant hormones" along with all naturally-occurring and synthetic products, including ethylene and ammonia, which exert any stimulating effect whatever upon plant growth. The naphthyl and indyl aliphatic acids and acidamid derivatives, however, are not the equivalent of such naturally-occurring materials as auxin A, auxin B, and auxin-containing extracts of plant and animal material. An important point of differentiation resides in the fact that such naturally-occurring materials are almost invariably mixtures comprising substantial amounts of growth-inhibiting substances so that the effect of such mixture upon the plant may be detrimental rather than desirable. Furthermore, such naturally-occurring products are (1) expensive because of the involved processes required for their separation, (2) relatively unstable to acids, alkalies, and light, and (3) of indefinite purity and auxin content, so that their effectiveness in a given composition is not readily ascertained or predicted.

I have discovered that when a synthetic auxin is mixed with an organic insecticidal toxicant a composition is obtained which may be advantageously incorporated into spray and dust materials for the treatment of the aerial portion of plants. It has further been found that the desirable properties of such compositions are not just the sum of the properties of their constituents but that new and unpredictable results are obtained with sprays and dusts embodying the new mixtures.

The term "synthetic auxin" as herein employed refers to chemically pure organic compounds, particularly acids and acidamids, capable of causing an enlargement of the plant cell, as distinguished from those substances that influence plant growth by supplying nutrient to the plant. The class of "synthetic auxins" includes indyl-acetic acid, indyl-propionic acid, indyl-butyric acid, alpha-naphthyl-acetic acid, alpha-naphthyl-propionic acid, phenyl-acetic acid, fluorene-acetic acid, anthracene-acetic acid, the esters and salts of such acids, alpha-naphthyl-acetamid, alpha-naphthyl-propionamid, and indyl-acetamid, all of which are readily prepared according to known methods of organic synthesis. The term does not include inorganic stimulants auxin A, auxin B, or substances such as ammonia and ethylene which have undesirable volatility. Each of the compounds included within the class contains an indole, benzene, naphthalene, anthracene, or fluorene ring structure and is characterized by having plant hormone-like properties.

The expression "aerial portion of plants" as herein employed refers to the stem, leaf, flower, and fruit of the plant. The expression is comparable to the term "shoot" in distinction to "root," except that where "shoot" is most frequently employed to designate a sprout or tender green growth from a seed or bulb, it is the intent of the present expression to include the trunk, branches, stems, leaves, flowers, and fruit of trees as well.

In carrying out the invention an organic insecticidal toxicant is mixed with a synthetic auxin to obtain the desired composition. This mixing may be carried out in any suitable manner. For example, the insecticidal toxicant and synthetic auxin, both in chemically pure form, may be mixed or ground together to form a concentrate adapted to be incorporated in standard dust or spray compositions for application to plants. In this embodiment of the invention, the proportions of materials employed vary with the form and manner in which the diluted concentrate is to be employed. When the concentrate is to be subsequently incorporated into a spray, the proportions of constituents in the concentrate are so adjusted that at the preferred concentration of the insecticidal toxicant the synthetic auxin will be present in the diluted composition at from 2 to 40 parts per million and preferably between 5 to 15 parts per million. When the concentrate is to be subsequently incorporated into a dust, the amount of synthetic auxin employed is such as to provide from 10 to 1000 parts per million, and preferably from 50 to 250 parts per million in the finished composition. The exact limits observed in each instance are dependent upon the tolerance of the plant to be treated.

In preparing concentrates as outlined above, the mixture of insecticidal toxicant and synthetic auxin may be modified with any suitable carrier, wetting, dispersing, or emulsifying agent. For example, the two major ingredients may be ground or otherwise dispersed in or on a solid carrier such as bentonite, diatomaceous earth, gypsum, talc, wood flour, volcanic ash, or any mixture of one or more of such finely-divided inerts to obtain the concentrate in the form of a dust or powder. Similarly, a solvent for both of the ingredients such as glycerol, alcohol, acetone, acetone-alcohol, glycol, or suitable ester or ether compound may be employed to obtain a concentrate solution. In further modifications the synthetic auxin and toxicant may be ground with water or other non-solvent to form a paste concentrate, or so processed as to form an emulsion containing high concentrations of each ingredient.

In any of the foregoing situations, such wetting, dispersing, and emulsifying agents as sodium-lauryl sulfate, sodium and potassium salts of sulfonated oils, salts of sulfonated phenols, salts of sulfonated benzene and naphthalene, soaps, alkanolamines, sulfite pulping waste, caseinates, glyceryl esters, long chain fatty acids, etc. may be employed as expedient, provided only that such added ingredient not be so reactive with the synthetic auxin or insecticidal toxicant as to limit the effectiveness of the composition.

The concentrates as prepared above are subsequently diluted with finely-divided solids or suitable liquid carriers to obtain dusts, aqueous dispersions, or emulsions adapted to be employed for the treatment of the aerial portion of growing plants substantially as hereinafter set forth.

In an alternate procedure the insecticidal toxicant may be dispersed in a dilute spray or dust composition comprising the preferred amount of the synthetic auxin. Similarly, the required amount of synthetic auxin may be added to an insecticidal spray or dust comprising an organic toxicant to obtain compositions falling within the scope of the present invention.

Regardless of whether the ultimate plant treatment material is prepared by dilution of a concentrate or by addition of one or both of the principal ingredients to a previously prepared dilute composition, the results obtained upon application of the mixture to plant and insect life are the same. It has been found that the synthetic auxin frequently serves as an activator for the organic insecticide toxicant, whereby a greater than additive kill of insect pests is obtained. In addition to this result, the organic insecticidal toxicant cooperates with the synthetic auxin to materially increase the effectiveness of the latter in controlling the formation of abscission layer, as for example, in preventing fruit drop. The application of the organic insecticides alone to fruit-laden trees does not prevent premature dropping but frequently accelerates the abscission of the fruit. In view of the diverse character of the organic toxicants which have been found to cooperate with the synthetic auxins, no limiting explanation or theory is presented for the phenomena as observed.

While the present invention is concerned with compositions comprising organic insecticides broadly, preferred groups of toxicants are (1) those compounds containing at least one six-membered conjugated ring structure such as the nicotine and benzene rings, and (2) extracts of pyrethrin- and rotenone-containing plants.

The following examples illustrate the invention but are not to be construed as limiting the same.

Example 1

A pyrethrin solution was prepared by dissolving a standard pyrethrum extract in a light petroleum distillate having a boiling range of 345°–508° F. and a flash point of 137° F. The amount of pyrethrum extract employed was such as to give a concentration of 50 milligrams of pyrethrins for each 100 milliliters of solution. This composition was tested according to the Peet-Grady method substantially as described in Soap 8, No. 4, 1932, and found to give a knockdown of 93.7 per cent in 10 minutes and a kill of 28.1 per cent in 48 hours against three-day old houseflies. Sufficient alpha-naphthyl-acetic acid was then added to a portion of the pyrethrin solution to give a concentration of 10 parts per million of the alpha-naphthyl acetic acid. This modified composition was similarly tested according to the Peet-Grady method and found to give a knockdown of 94.3 per cent in 10 minutes and a kill of 44.1 per cent in 48 hours. In a control determination, the alpha-naphthyl-acetic acid alone dissolved in the petroleum distillate in the amount of 20 parts per million gave 0.00 knockdown and 0.00 kill according to the Peet-Grady method.

Example 2

In a similar manner 0.0125 gram of rotenone was dissolved in a mixture of 12.5 milliliters of methylethyl ketone with 87.5 milliliters of petroleum oil. This composition was found to give a knockdown of 12.7 per cent in 10 minutes and a kill of 3.0 per cent in 48 hours according to the Peet-Grady procedure. A portion of this solution was modified with 10 parts per million of alpha-naphthyl-acetic acid and found to give a knockdown of 30.9 per cent in 10 minutes and a kill of 9.5 per cent in 48 hours. 20 parts per million of alpha-naphthyl-acetic acid in the petroleum oil-methylethyl ketone mixture gave 0.00 knockdown and 0.00 kill in a control determination.

Example 3

Indyl-acetic acid was dissolved in a standard nicotine sulfate spray in amount sufficient to give a concentration of 40 parts per million in the spray composition. This spray was applied to greenhouse tomato plants for the control of aphids and thrips. In addition to exerting an insecticidal action, the spray was found to be highly effective in the artificial fertilization of the tomato flowers, whereby seedless fruits were developed on the sprayed vines.

Example 4

Alpha-naphthyl-acetic acid and is sodium salt were compounded with a number of organic insecticidal toxicants to form concentrates later diluted with water and applied on McIntosh apple trees immediately prior to the normal harvesting time of the apples. No injury to foliage or fruit was observed with any of the compositions employed. In each instance the proportions employed were such that, when the concentrate was diluted to give the concentration of organic insecticidal toxicant usually employed in tree sprays, the concentration of the synthetic auxin in the dilute spray material was approximately 10 parts per million. Control determinations were made in which a spray comprising 10 parts per million of alpha-naphthyl-acetic acid alone was applied to the aerial portions of the trees. The number of apples present on each sprayed tree was determined both before spraying and daily for a period of 7 days after the spray application and the per cent drop for each tree calculated. The average per cent fruit drop shown by several trees sprayed with alpha-naphthyl-acetic acid alone was 3.24. Although none of the insecticidal toxicants employed had any effect upon fruit drop when used alone, the combination of such toxicants with the synthetic auxin gave results which were very superior to those obtained with alpha-naphthyl-acetic acid alone. The following compositions are representative of those employed.

Composition A: Parts by weight
Beta - (4 - tertiarybutyl - phenoxy)-ethanol _____ 50.00
Alpha-naphthyl-acetic acid _____ 0.44
Peanut oil _____ 29.56
Wetting agent (condensation product of ethylene oxide and an organic acid marketed as "Emulphor EL" ___ 20.00

This composition was dispersed at the rate of 227 grams per 25 gallons of water and applied to a tree bearing 1269 apples. At the end of 7 days, a total of 17 apples had fallen from the tree for a percentage drop of 1.34. This was 41.5 per cent of the drop obtained when alpha-naphthyl-acetic acid alone was employed.

Composition B: Parts by weight
Beta - (2.4.6 - trichloro - phenoxy)-beta'-chloro-diethyl ether _____ 10.00
Beta - (4 - tertiarybutyl - phenoxy)-ethanol _____ 40.00
Derris resin (containing 25 per cent rotenone) _____ 5.00
Alpha-naphthyl-acetic acid _____ 0.44
Peanut oil _____ 24.56
Wetting agent ("Emulphor EL") _____ 20.00

This composition was applied at a dilution of 227 grams per 25 gallons of water to a tree bearing 697 apples. At the end of 7 days, only 8 apples had fallen from the tree to give a percentage drop of 1.06. This drop represents but 32.6 per cent of that taking place on trees treated with alpha-naphthyl-acetic acid alone.

Composition C: Parts by weight
2.4-dinitro-6-cyclohexyl-phenol _____ 11.25
Alpha-naphthyl-acetic acid _____ 0.79
Sodium lauryl sulfate _____ 8.90
Gypsum _____ 79.00

The foregoing concentrate was in the form of a dust in which the various constituents were finely ground one with the other. The composition was applied at the rate of 125 grams per 25 gallons of water to a tree bearing 964 apples. At the end of 7 days, 20 apples had fallen from the tree for a drop of 2.08 per cent. This is but 64.5 per cent of the drop observed when alpha-naphthyl-acetic acid alone was employed.

Composition D: Parts by weight
2.4-dinitro-6-cyclohexyl-phenol _____ 0.80
Sulfur _____ 93.98
Inert (wetting and dispersing agent) __ 5.00
Alpha-naphthyl-acetic acid _____ 0.22

The foregoing materials were ground together to form a dust concentrate which was applied to a tree bearing 564 apples at the rate of 455 grams per 25 gallons of water. After 7 days, 8 apples had fallen from the tree which is a drop of 1.37 per cent, and only 42.4 per cent of the drop obtained with alpha-naphthyl-acetic acid alone.

Composition E: Parts by weight
Dicyclohexyl-amine salt of 2.4-dinitro-6-cyclohexyl-phenol _____ 20.00
Bentonite _____ 10.00
Gypsum _____ 67.41
Sodium lauryl sulfate _____ 2.00
Alpha-naphthyl-acetic acid _____ 0.59

This dust concentrate was applied at the rate of 170 grams per 25 gallons of water to a tree bearing 764 apples. After 7 days, 4 apples had fallen from the tree for a drop of 0.51 per cent. This drop is but 15.7 per cent of that allowed by alpha-naphthyl-acetic acid alone.

Composition F: Parts by weight
2.4-dinitro-6-cyclohexyl-phenol _____ 22.20
Triethanol amine _____ 5.50
Alpha-naphthyl-acetic acid _____ 1.83
Water _____ 70.45

This liquid concentrate was applied at the rate of 59.1 grams per 25 gallons of water to a tree bearing 483 apples. At the end of 7 days, 8 apples had fallen for a drop of 1.66 per cent. This drop was but 51 per cent of that allowed by alpha-naphthyl-acetic acid alone.

Composition G: Parts by weight
Glycerine ethyl ester of 2.4-dinitro-6-cyclohexyl-phenol _____ 20.00
Bentonite _____ 10.00
Gypsum _____ 67.41
Sodium lauryl sulfate _____ 2.00
Alpha-naphthyl-acetic acid _____ 0.59

This concentrate was applied at the rate of 170 grams per 25 gallons of water to a tree bearing 787 apples. After 7 days, 13 apples had fallen from the tree for a drop of 1.65 per cent. This drop is 51 per cent of that permitted by alpha-naphthyl-acetic acid alone.

Composition H: Parts by weight
Sodium 2.4-dinitro-phenate _____ 36.55
Sodium alpha-naphthyl-acetate _____ 5.70
Sodium lauryl sulfate _____ 57.75

This composition was applied at the rate of 19.5 grams per 25 gallons of water to a tree bearing 951 apples. At the end of 7 days, 14 apples had fallen from the tree to give a drop of 1.47 per cent. This represents only 45.5 per cent of the drop resulting when alpha-naphthyl-acetic acid alone was employed.

Composition I: Parts by weight
Phenothioxin _____ 20.00
Gypsum _____ 67.82
Bentonite _____ 10.00
Alpha-naphthyl-acetic acid _____ 0.18
Sodium lauryl sulfate _____ 2.00

This composition was applied at the rate of 568 grams in 25 gallons of water to a tree bearing 1214 apples. At the end of 7 days, 12 apples had fallen from the tree for a drop of 0.99 per cent. This represents 30.5 per cent of the fall observed when alpha-naphthyl-acetic acid alone was employed.

Composition J:

| | Parts by weight |
|---|---|
| Phenothioxin | 5.00 |
| Beta-(4 - tertiarybutyl - phenoxy)-ethanol | 20.00 |
| Alpha-naphthyl-acetic acid | 0.18 |
| Derris resin | 2.00 |
| Acme white oil | 52.82 |
| Wetting agent ("Emulphor EL") | 20.00 |

This concentrate was applied at the rate of 568 grams per 25 gallons of water to a tree bearing 1641 apples. At the end of 7 days, 28 apples had fallen from the tree for a drop of 1.71 per cent. This is 52.5 per cent of the drop observed when alpha-naphthyl-acetic acid was employed alone.

Composition K:

| | Parts by weight |
|---|---|
| Phenothioxin-10-oxide | 20.00 |
| Gypsum | 67.82 |
| Bentonite | 10.00 |
| Alpha-naphthyl-acetic acid | 0.18 |
| Sodium lauryl sulfate | 2.00 |

This composition was applied at the rate of 568 grams per 25 gallons of water to a tree bearing 571 apples. At the end of 7 days, 6 apples had fallen from the tree for a drop of 1.05 per cent. This represents 32.5 per cent of the drop observed with alpha-naphthyl-acetic acid alone.

Composition L:

| | Parts by weight |
|---|---|
| Phenothiazine | 20.00 |
| Alpha-naphthyl-acetic acid | 0.18 |
| Gypsum | 67.82 |
| Bentonite | 10.00 |
| Sodium lauryl sulfate | 2.00 |

This composition was applied at the rate of 568 grams per 25 gallons of water to a tree bearing 855 apples. At the end of 7 days, 13 apples had fallen for a drop of 1.52 per cent. This represents 47 per cent of the drop obtained with a spray solution comprising alpha-naphthyl-acetic acid alone.

Composition M:

| | Parts by weight |
|---|---|
| Pineyl-diphenyl oxide | 80.00 |
| Sulfonated sperm oil (sold as "NOPCO 1216") | 19.82 |
| Alpha-naphthyl-acetic acid | 0.18 |

This concentrate was added to water in the amount of 568 grams per 25 gallons and sprayed on a tree bearing 960 apples. At the end of 7 days, 15 apples had fallen for a drop of 1.56 per cent. This represents 48 per cent of the drop observed when alpha-naphthyl-acetic acid was employed alone.

Composition N:

| | Parts by weight |
|---|---|
| (4 - tertiarybutyl - phenyl) (diphenyl) phosphate | 80.00 |
| Wetting agent ("Emulphor EL") | 19.82 |
| Alpha-naphthyl-acetic acid | 0.18 |

This concentrate was applied to a tree bearing 1412 apples at a dilution of 568 grams per 25 gallons of water. At the end of 7 days, 21 apples had fallen from the tree to give a drop of 1.49 per cent. This represents 46 per cent of the drop obtained with the spray comprising alpha-naphthyl-acetic acid alone.

Composition O:

| | Parts by weight |
|---|---|
| Gamma-(2-cyclohexyl - phenoxy)-propyl thiocyanate | 22.50 |
| Pine oil | 48.06 |
| Sulphonated sperm oil ("NOPCO 1216") | 23.00 |
| Acme white oil | 6.00 |
| Alpha-naphthyl-acetic acid | 0.44 |

This composition was applied at the rate of 227 grams per 25 gallons of water to a tree bearing 526 apples. At the end of 7 days, 6 apples had fallen for a drop of 1.14 per cent. This represents 35.2 per cent of the fall observed when alpha-naphthyl-acetic acid was employed alone.

Composition P:

| | Parts by weight |
|---|---|
| Nicotine sulfate (as alkaloid) | 20.50 |
| Sodium alpha-naphthyl-acetate | 0.35 |
| Sodium lauryl sulfate | 3.62 |
| Water | 75.53 |

This concentrate was applied to a tree bearing 708 apples at the rate of 312 grams per 25 gallons of water. At the end of 7 days, 7 apples had fallen from the tree for a drop of 0.99 per cent. This represents 30.5 per cent of the drop obtained with alpha-naphthyl-acetic acid alone.

Composition Q:

| | Parts by weight |
|---|---|
| Ethylene glycol diacetate | 99.26 |
| Alpha-naphthyl-acetic acid | 0.74 |

This composition was applied to a tree bearing 1044 apples at the rate of 4 fluid ounces per 25 gallons of water. At the end of 7 days, 12 apples had fallen from the tree to give a drop of 1.15 per cent. This is 35.5 per cent of the drop observed when alpha-naphthyl-acetic acid alone was applied.

Other compositions which may be similarly employed include the following:

Composition R:

| | Parts by weight |
|---|---|
| Beta -(2.4.6-trichloro-phenoxy) beta'-thiocyano-diethyl ether | 22.50 |
| Alpha-naphthyl-acetamid | 0.44 |
| Pine oil | 48.06 |
| Sulfonated sperm oil ("NOPCO 1216") | 23.00 |
| Acme white oil | 6.00 |

This composition may be applied to growing trees at a dilution of 227 grams per 25 gallons of water.

Composition S:

| | Parts by weight |
|---|---|
| Trichloro-monofluoro-benzene | 20.00 |
| Bentonite | 77.82 |
| Alpha-naphthyl-acetic acid | 0.18 |
| Sodium lauryl sulfate | 2.00 |

This composition may be applied at the rate of 568 grams per 25 gallons of water.

Composition T:

| | Parts by weight |
|---|---|
| Xanthone | 97.67 |
| Sodium-alpha-naphthyl-acetate | 0.33 |
| Sodium lauryl sulfate | 2.00 |

This composition may be employed at the rate of 342 grams in 25 gallons of water.

Composition U:

| | Parts by weight |
|---|---|
| Dibutyl phthalate | 50.00 |
| Derris resin | 10.00 |
| Indyl-acetic acid | 0.44 |
| Peanut oil | 19.56 |
| Wetting agent ("Emulphor EL") | 20.00 |

This composition may be applied at the rate of 227 grams per 25 gallons of water.

In a similar manner such compounds as indyl-butyric acid, indyl-propionic acid, alpha-naphthyl-propionic acid, phenyl-acetic acid, fluorene-acetic acid, alpha-naphthyl-propionamid, and indyl-acetamid as well as the organic and inorganic salts of the foregoing acids may be compounded with organic insecticides to obtain compositions having the same general properties as those shown in the foregoing examples.

Other modes of applying the principle of my invention may be employed instead of those explained, change being made as regards the materials employed, provided the products described in the following claims be thereby obtained.

I therefore particularly point out and distinctly claim as my invention:

1. A plant treatment composition comprising a synthetic auxin and an organic insecticidal toxicant.

2. A composition of matter adapted to be applied to the aerial portion of plants comprising an organic insecticidal toxicant and a relatively small amount of a synthetic auxin.

3. An insecticidal and plant growth control concentrate adapted to be diluted to produce compositions for application to the aerial portion of plants comprising an intimate mixture of an organic insecticidal toxicant and a synthetic auxin.

4. A spray composition adapted to be applied to the aerial portion of plants comprising an organic insecticidal toxicant and from 2 to 40 parts per million of a synthetic plant auxin.

5. A dust composition adapted to be applied to the aerial portion of plants comprising an organic insecticidal toxicant and from 10 to 1000 parts per million of a synthetic auxin.

6. An insecticidal and plant growth control concentrate adapted to be diluted to produce compositions for application to the aerial portion of plants comprising an intimate mixture of an organic insecticidal toxicant, a synthetic auxin, and a wetting agent.

7. A plant treatment composition comprising alpha-naphthyl-acetic acid and an organic insecticidal toxicant.

8. A composition of matter adapted to be applied to the aerial portion of plants comprising an organic insecticidal toxicant and a relatively small amount of alpha-naphthyl acetic acid.

9. An insecticidal and plant growth control concentrate adapted to be diluted to produce compositions for application to the aerial portion of plants comprising an intimate mixture of an organic insecticidal toxicant and alpha-naphthyl-acetic acid.

10. A spray composition adapted to be applied to the aerial portion of plants comprising an organic insecticidal toxicant and from 2 to 20 parts per million of alpha-naphthyl-acetic acid.

11. An insecticidal and plant growth control concentrate adapted to be diluted to produce compositions for application to the aerial portion of plants comprising an intimate mixture of an organic insecticidal toxicant, alpha-naphthyl-acetic acid, and a wetting agent.

12. A composition of matter adapted to be applied to the aerial portion of plants comprising an organic insecticidal toxicant and a relatively small amount of the sodium salt of alpha-naphthyl-acetic acid.

13. A spray composition adapted to be applied to the aerial portion of plants comprising an organic insecticidal toxicant and from 2 to 40 parts per million of the sodium salt of alpha-naphthyl-acetic acid.

14. A composition of matter adapted to be applied to the aerial portion of plants comprising an organic insecticidal toxicant and a relatively small amount of indyl-acetic acid.

15. A spray composition adapted to be applied to the aerial portion of plants comprising an organic insecticidal toxicant and from 2 to 40 parts per million of indyl-acetic acid.

GEORGE S. AVERY, Jr.

CERTIFICATE OF CORRECTION.

Patent No. 2,305,593. December 22, 1942.

GEORGE S. AVERY, JR.

It is hereby certified that error appears in the printed specification of the above numbered patent requiring correction as follows: Page 2, first column, line 17, for "duct" read --dust--; page 3, second column, line 45, for "Glycerine" read --Glycine--; and that the said Letters Patent should be read with this correction therein that the same may conform to the record of the case in the Patent Office.

Signed and sealed this 16th day of March, A. D. 1943.

(Seal)

Henry Van Arsdale,
Acting Commissioner of Patents.